US012645862B2

(12) United States Patent
Kumar et al.

(10) Patent No.: US 12,645,862 B2
(45) Date of Patent: Jun. 2, 2026

(54) ENHANCING VARIABLE FONT TRANSITIONS BY GENERATING AND REORDERING FONT INSTANCES

(71) Applicant: Adobe Inc., San Jose, CA (US)

(72) Inventors: Pranay Kumar, Noida (IN); Nipun Jindal, Delhi (IN)

(73) Assignee: Adobe Inc., San Jose, CA (US)

( * ) Notice: Subject to any disclaimer, the term of this patent is extended or adjusted under 35 U.S.C. 154(b) by 302 days.

(21) Appl. No.: 18/417,542

(22) Filed: Jan. 19, 2024

(65) Prior Publication Data

US 2025/0238595 A1 Jul. 24, 2025

(51) Int. Cl.
*G06F 40/109* (2020.01)
*G06F 3/0482* (2013.01)

(52) U.S. Cl.
CPC .......... *G06F 40/109* (2020.01); *G06F 3/0482* (2013.01)

(58) Field of Classification Search
CPC .......................... G06F 3/048–05; G06F 40/109
See application file for complete search history.

(56) References Cited

U.S. PATENT DOCUMENTS 5,995,086 A * 11/1999 Dowling ................ G06K 15/02
345/467
8,520,003 B2 * 8/2013 Levien .................... G06T 11/23
345/442

| | | | | |
|---|---|---|---|---|
| 11,210,450 | B1 * | 12/2021 | Dhanuka | G06F 40/109 |
| 11,295,181 | B2 * | 4/2022 | Kumawat | G06T 11/23 |
| 11,366,953 | B1 * | 6/2022 | Kumawat | G06F 3/04847 |
| 2018/0253883 | A1 * | 9/2018 | Shanbhag | G06F 40/109 |
| 2019/0197087 | A1 * | 6/2019 | Betts | G06F 40/109 |
| 2022/0075926 | A1 * | 3/2022 | Dhanuka | G06F 40/109 |
| 2022/0261529 | A1 * | 8/2022 | Kumawat | G06F 40/109 |
| 2022/0284170 | A1 * | 9/2022 | Sawaf | G06F 40/109 |
| 2024/0054713 | A1 * | 2/2024 | Helmling | G06T 13/80 |

OTHER PUBLICATIONS

"Interactive Animations with Variable Fonts," webpage <https://fonts.google.com/knowledge/using_variable_fonts_on_the_web/interactive_animations_with_variable_fonts>, 2 pages, retrieved on Jan. 23, 2024.

(Continued)

*Primary Examiner* — Daniel Rodriguez
(74) *Attorney, Agent, or Firm* — Keller Preece PLLC

(57) ABSTRACT

The present disclosure relates to systems, non-transitory computer-readable media, and methods for generating and visualization font variation instances of a variable font using deep-aware focal points in a font variation space. In particular, in one or more embodiments, the disclosed systems determine, for a variable font, a set of predefined font variation instances defining named typeface variations of the variable font. In some embodiments, the disclosed systems generate, from the set of predefined font variation instances, a plurality of focal points representing additional typeface variations of the variable font in a font variation space. In one or more embodiments, the disclosed systems generate, from the plurality of focal points in the font variation space, a modified set of font variation instances defining intermediate typeface variations between the named typeface variations of the variable font.

20 Claims, 12 Drawing Sheets

(56)             References Cited

OTHER PUBLICATIONS

"Standardized Font Weight Metric As Per Opentype Standards," webpage <https://learn.microsoft.com/en-us/typography/opentype/spec/os2#usweightclass>, 1 page, Sep. 29, 2023, retrieved on Mar. 21, 2024.
"Standardized Font Width Metric As Per Opentype Standards," webpage <https://learn.microsoft.com/en-us/typography/opentype/spec/os2#uswidthclass>, 1 page, Sep. 29, 2023, retrieved on Mar. 21, 2024.

* cited by examiner

1100

Determining Font Variation Instances For A Variable Font *1102*

Generating Focal Points From The Font Variation Instances *1104*

Determining Primary Focal Points *1104a*

Determining Secondary Focal Points *1104b*

Generating Modified Font Variation Instances From The Focal Points *1106*

Providing A Graphical Visualization For Display *1108*

ENHANCING VARIABLE FONT TRANSITIONS BY GENERATING AND REORDERING FONT INSTANCES

BACKGROUND

Recent years have seen significant improvements in systems that generate and visualize variable fonts. For example, some systems are able to generate animations (or other visualizations) for a variable font that depict typeface variations of the variable font across its various named or known instances. Although conventional systems are able to visualize known instances for variable fonts, these systems have a number of technical deficiencies regarding the quality and generation of the visualizations which are often jarring and inconsistent.

SUMMARY

Embodiments of the present disclosure provide benefits and/or solve one or more of the foregoing or other problems in the art with systems, non-transitory computer-readable media, and methods for generating and visualizing synthesized font variations that fill stylistic gaps between existing named typefaces of a variable font. For example, the disclosed systems generate deep aware embeddings in the form of primary and secondary focal points that represent variable font instances in a font variation space. In some embodiments, the disclosed systems determine a transition route for reordering and/or transitioning between predefined named instances and generated instances corresponding to focal points of a variable font. In some cases, the disclosed systems generate animations and/or other graphical visualizations that smoothly transition among the typefaces of a variable font, including typefaces for predefined instances and for generated instances. Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
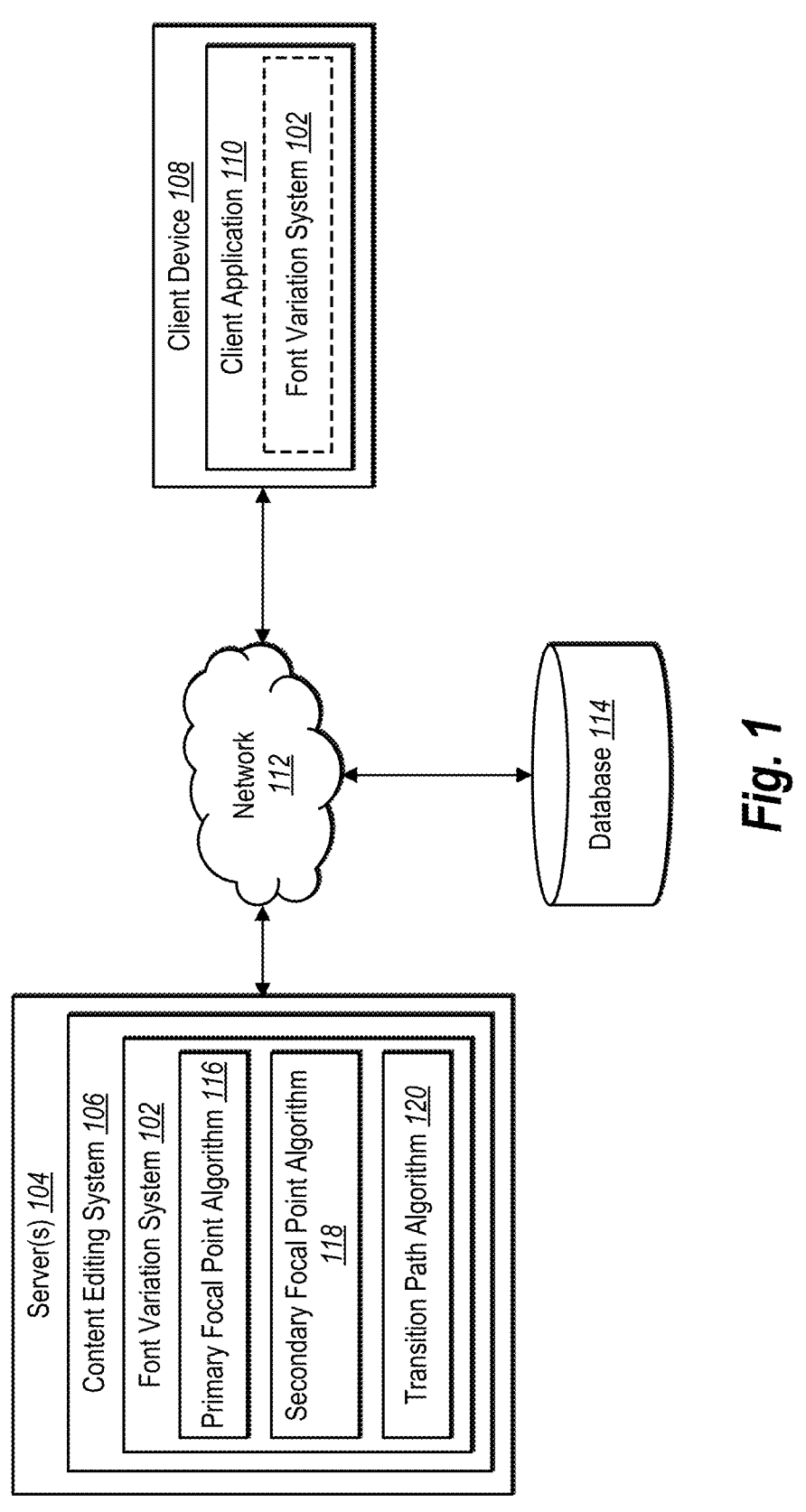
FIG. 1 illustrates an example system environment in which a font variation system operates in accordance with one or more embodiments.

This disclosure describes one or more embodiments of a font variation system that generates and reorders variable font instances using deep-aware primary and secondary focal points in a font variation space. In particular, in some embodiments, the font variation system utilizes specialized algorithms to generate primary focal points that define characteristics of new (e.g., generated) font instances of a variable font in a font variation space. From the primary focal points, in some embodiments, the font variation system further generates or extracts secondary focal points that define additional variable font instances which fit stylistically (or visually) in between existing named or known typefaces of the variable font. In some cases, the font variation system additionally determines a transition path or transition route among the existing and newly generated instances of the variable font. Based on the transition path, in certain embodiments, the font variation system further generates a font transition animation or some other graphical visualization depicting transitions among the variable font instances (predefined and newly generated) along the transition path.

As just mentioned, in some embodiments, the font variation system determines a set of predefined (e.g., known or named by font designers/creators) typeface variations or font instances of a variable font and further generates additional variations or instances for the variable font (e.g., that fit stylistically between the predefined ones). For example, the font variation system determines, extracts, or generates deep-aware focal points of a variable font in a font variation space. Specifically, in some embodiments, the font variation system generates primary focal points using a primary focal point algorithm and generates secondary focal points using a secondary focal point algorithm. In some cases, the font variation system generates the primary focal points by extracting deep features from characteristics of predefined font instances. In these or other cases, the font variation system generates the secondary focal points by extracting additional deep features based on a grid representing dimensions of the primary focal points in the font variation space.

As also mentioned, in one or more embodiments, the font variation system determines a transition path among the typeface instances or font variations of a variable font. For instance, the font variation system determines a transition path by comparing distances between focal points in the font variation space and reordering the typeface instances/variations to reduce (e.g., minimize) a total distance or difference between them. In some cases, the font variation system further generates a font transition animation that visually depicts the changes in visual appearance of the variable font instances/typefaces defined by the transition path of focal points.

As suggested above, many conventional variable font systems exhibit a number of shortcomings or disadvantages, particularly in the quality of variable font visualizations. For example, conventional systems provide tedious, non-intuitive variable font visualizations that are choppy and inconsistent. Some existing systems provide visualizations, such as animations, that transition across sparsely populated font instances and/or directly between dissimilar font variations or typefaces, resulting in jarring transitions that are not smooth and provide little to no indication of relatedness among the various typefaces. As a contributing factor to the visually jarring nature of conventional variable font visualizations, many existing systems include only a sparse set of predefined instances or typefaces for some variable fonts, with large stylistic gaps and little consistently or commonality between them.

Consequently, existing interface tools for designing or selecting typefaces for variable fonts also fall short, particularly in terms of flexibility. For instance, many existing systems either lack such tools entirely or provide manual interface options for creating predefined font instances or typefaces (e.g., as presets) that are tedious and time consuming. Indeed, existing systems are often rigidly fixed to a limited set of predefined font instances or provide a limited set of tools for manually defining font parameters to indicate the visual characteristics of variable font typefaces. In either case, such existing systems are unable to adapt to more intuitive typeface generation and/or to provide larger, more robust sets of typeface instances that span more stylistic variations of a variable font.

As suggested above, embodiments of the font variation system provide certain improvements or advantages over conventional variable font systems. For example, embodiments of the font variation system improve the quality of variable font visualizations. In some embodiments, the font variation system generates additional font variations that fit stylistically between predefined font instances of a variable font. Indeed, the font variation system uses a font-metric aware algorithm in an n-dimensional font variation space to generate primary and secondary focal points that define additional instances or typefaces for a variable font. In addition, the font variation system determines a font transition path as well to reorder font instances based on distances between them in font variation space. As a result of generating additional deep-aware typeface variations, the font variation system also generates smoother, higher quality font visualizations than prior systems as well. Specifically, the font variation system generates font transition animations (or other graphical visualizations) that more smoothly transition between font instances to show changes in style and appearance, without such jarring or choppy effects as in prior systems.

In addition, certain embodiments of the font variation system provide improved flexibility over existing variable font systems. For instance, the font variation system provides font creation or generation tools that are more intuitive than those available in prior systems. Indeed, by generating primary and secondary focal points to represent font instances in a font variation space, the font variation system flexibly adapts variable fonts across various style axes (e.g., axes specific to respective font characteristics or parameters) in n-dimensional space, providing robust coverage of various styles and appearances. Consequently, the font variation system also provides user interface tools for intuitively manipulating navigating among the various font instances that smoothly transition from one to the next without the visually jarring effects of prior systems.

Additional detail regarding the font variation system will now be provided with reference to the figures. For example, FIG. 1 illustrates a schematic diagram of an example system environment for implementing a font variation system 102 in accordance with one or more embodiments. An overview of the font variation system 102 is described in relation to FIG. 1. Thereafter, a more detailed description of the components and processes of the font variation system 102 is provided in relation to the subsequent figures.

As shown, the environment includes server(s) 104, a client device 108, a database 114, and a network 112. Each of the components of the environment communicate via the network 112, and the network 112 is any suitable network over which computing devices communicate. Example networks are discussed in more detail below in relation to FIG. 12.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 12. Although FIG. 1 illustrates a single instance of the client device 108, in some embodiments, the environment includes multiple different client devices, each associated with a different user. The client device 108 communicates with the server(s) 104 and/or the content editing system 106 via network 112. For example, the client device 108 receives visualization data to display variable font visualizations (e.g., font transition animations) and provides information to server(s) 104 indicating font data for a variable font and/or user interactions for modifying a variable font.

As shown in FIG. 1, the client device 108 includes a client application 110. In particular, the client application 110 is a web application, a native application installed on the client device 108 (e.g., a mobile application or a desktop application), or a cloud-based application where all or part of the functionality is performed by the server(s) 104. The client application 110 presents or displays information to a user, including variable font interfaces for editing, modifying, generating, animating, or visualizing variable fonts.

As also illustrated in FIG. 1, the environment includes the server(s) 104. The server(s) 104 generates, tracks, stores, processes, receives, and transmits electronic data, such as font data, font visualizations, and data pertaining deep-aware focal points (e.g., primary focal points and secondary focal points). For example, the server(s) 104 receives data from the client device 108 in the form of interaction data requesting a modification to, or a visualization of, a variable font. In response, the server(s) 104 provides data to the client device 108 in the form of modified variable font data, including additional font instances or typefaces corresponding to deep-aware focal points and/or a graphical visualization of a variable font, such as a font transition animation playable at the client device 108.

In some embodiments, the server(s) 104 communicates with the client device 108 to transmit and/or receive data via the network 112. In some embodiments, the server(s) 104 comprises a distributed server where the server(s) 104 includes a number of server devices distributed across the network 112 and located in different physical locations. The server(s) 104 comprise a content server, an application server, a communication server, a web-hosting server, a multidimensional server, or a machine learning server.

As further shown in FIG. 1, the server(s) 104 also includes the font variation system 102 as part of a content editing system 106. For example, in one or more implementations, the content editing system 106 stores, generates, modifies, edits, enhances, provides, distributes, and/or shares digital content, such as digital fonts, digital images, segmented transcripts, emails, or digital videos. For example, the content editing system 106 provides digital content for editing or other forms of digital processing. In some implementations, the content editing system 106 provides digital content to particular digital profiles associated with client devices (e.g., the client device 108).

In one or more embodiments, the server(s) 104 includes all, or a portion of, the font variation system 102. For example, the font variation system 102 operates on the server(s) 104 to: i) implement a primary focal point algorithm 116 for determining primary focal points in a font variation space, ii) implement a secondary focal point algorithm 118 for determining secondary focal points in the font variation space, and/or iii) implement a transition path algorithm 120 for determining a transition path among font instances (or focal points) of a variable font. In some embodiments, the client device 108 includes all or part of the font variation system 102. For example, the client device 108 generates, obtains (e.g., downloads), or uses one or more aspects of the font variation system 102, such as the primary focal point algorithm 116, the secondary focal point algorithm 118, and/or the transition path algorithm 120 from the server(s) 104. Indeed, in some implementations, as illustrated in FIG. 1, the font variation system 102 is located in whole or in part of the client device 108 (e.g., as part of the client application 110). For example, the font variation system 102 includes a web hosting application that allows the client device 108 to interact with the server(s) 104. To illustrate, in one or more implementations, the client device 108 accesses a web page supported and/or hosted by the server(s) 104.

In one or more embodiments, the client device 108 and the server(s) 104 work together to implement the font variation system 102. For example, in some embodiments, the server(s) 104 train one or more neural networks (e.g., neural networks for extracting font data and generating deep-aware focal points in a font variation space) and provide the one or more neural networks to the client device 108 for implementation. In some embodiments, the server(s) 104 trains one or more neural networks together with the client device 108.

Although FIG. 1 illustrates a particular arrangement of the environment, in some embodiments, the environment has a different arrangement of components and/or may have a different number or set of components altogether. For instance, as mentioned, the font variation system 102 is implemented by (e.g., located entirely or in part on) the client device 108. In addition, in one or more embodiments, the client device 108 communicates directly with the font variation system 102, bypassing the network 112.

Figure 2:
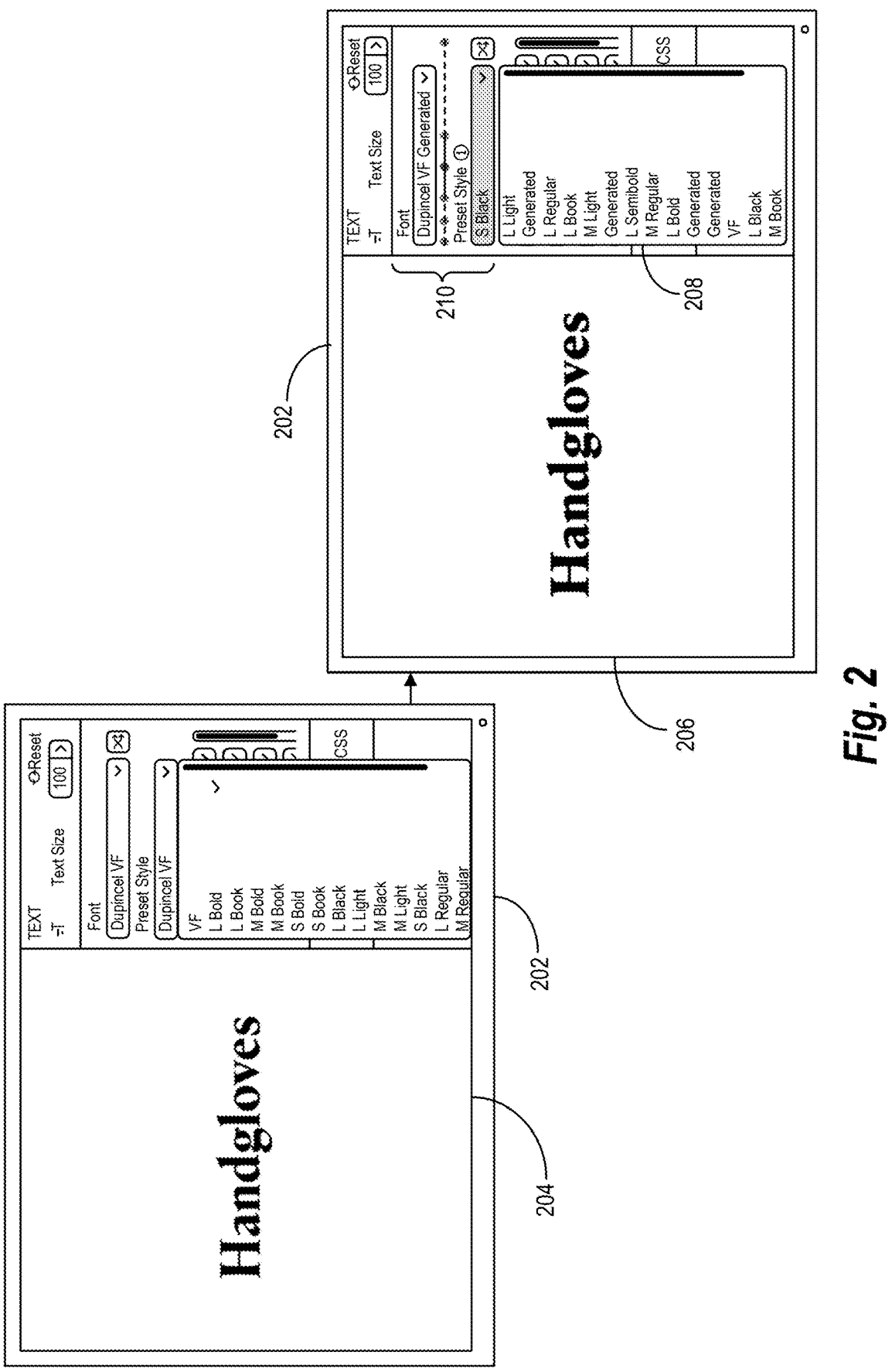
FIG. 2 illustrates an overview of generating a graphical visualization for a variable font based on primary focal points, secondary focal points, and a font transition path in accordance with one or more embodiments.

As mentioned, in one or more embodiments, the font variation system 102 generates and reorders font variation instances of a variable font. In particular, the font variation system 102 generates or extracts deep-aware focal points in a font variation space and reorders font instances of a variable font. FIG. 2 illustrates an example overview of generating and reordering font variation instances of a variable font in accordance with one or more embodiments. Additional detail regarding the various acts and aspects discussed in relation to FIG. 2 is provided thereafter with reference to subsequent figures.

As illustrated in FIG. 2, the client device 202 presents or displays a variable font interface 204 that includes a menu of predefined (e.g., known or existing) font instances or typefaces, each with its own visual characteristics or parameters that define its appearance. Within the menu of the variable font interface 204 (e.g., the interface of an existing conventional system), the font variation instances are ordered alphabetically, not based on appearance characteristics. Additionally, the only font variation instances shown in the variable font interface 204 are for predefined, named typefaces of the variable font called "Dupincel VF." In some cases, a font variation instance (or font instance or instance) includes a variation, instance, or preset of font parameters that define an appearance or visual characteristics of a certain typeface within a set of typefaces belonging to a variable font.

Along these lines, in some embodiments, a variable font is a single digital font file that contains or includes multiple variations of its typeface, where different parameter values for various (axis-specific) characteristics, such as weight, width, and slant, impact its appearance. In some cases, the variations of a variable font are defined as axes within the font file, and the font variation system 102 varies the values along axes to change typeface appearance (where each axis has a minimum and maximum value as defined by the variable font file), allowing for more flexibility in design as well as smaller file sizes or storage requirements compared to systems that use multiple static font files (e.g., one for each typeface). In some embodiments, variable fonts use interpolation to generate variations of a typeface in a font file. Such interpolation is a method that facilitates generating an intermediate value between two known values, and interpolation is linear interpolation or a more complex algorithm like a spline or a combination of interpolation techniques.

As further illustrated in FIG. 2, the font variation system 102 generates and provides a variable font interface 206 for display on the client device 202. Indeed, the font variation system 102 modifies the variable font interface 204 by generating and reordering font variation instances to include within the menu 208. More specifically, the font variation system 102 generates or extracts deep-aware focal points for a variable font (e.g., "Dupincel VF") within a font variation space. In some cases, the font variation system 102 generates primary focal points to represent predefined font instances (and/or additional font instances) within the font variation space.

Indeed, in some embodiments, primary focal points include plot points of vector representations or embeddings of known or predefined font instances (or embeddings extrapolated from predefined font embeddings) within a font variation space, as determined via a primary focal point algorithm. In these or other embodiments, a font variation space includes or refers to an n-dimensional embedding space that includes n axes representing respective font characteristics (e.g., weight, width, slant, etc.) of a variable font. Within a font variation space, in certain embodiments, secondary focal points include or refer to vector representations or embeddings of additional font variation instances generated from (or informed by) primary focal points, in accordance with a secondary focal point algorithm.

Along these lines, the font variation system 102 generates secondary focal points that fit stylistically between the primary focal points within the font variation space and that represent additional font variations or typefaces of the variable font. In certain embodiments, the font variation system 102 further determines a font transition path for reordering the font instances according to style or appearance. Thus, as shown in the menu 208, the font variation system 102 generates and reorders typeface variations within a modified list of presets or font instances. The list within the menu 208 orders the font instances based on style or appearance, where the overall distance across the transition path from instance to instance (or focal point to focal point) in the font variation space is reduced (or minimized) to satisfy a threshold.

As also illustrated in FIG. 2, the font variation system 102 provides a font adjustment tool 210. In particular, the font variation system 102 provides the font adjustment tool 210 that includes instance puckers (e.g., the dots along the horizontal line) that represent font instances in the font variation space. In some cases, the font variation system 102 represents the n-dimensional font variation space on a single line segment, where distances between the puckers represent overall stylistic differences or distances in the font variation space. In certain embodiments, the solid line portion of the font adjustment tool 210 reflects how (or an area in which) user input is moving (e.g., hovering, selecting, or dragging) within the font variation space to see differences in typefaces in a particular area or region (or along a portion of the line segment). Additional detail regarding generating and providing font modification tools and graphical visualizations for variable fonts is provided below with reference to subsequent figures.

Figure 3:
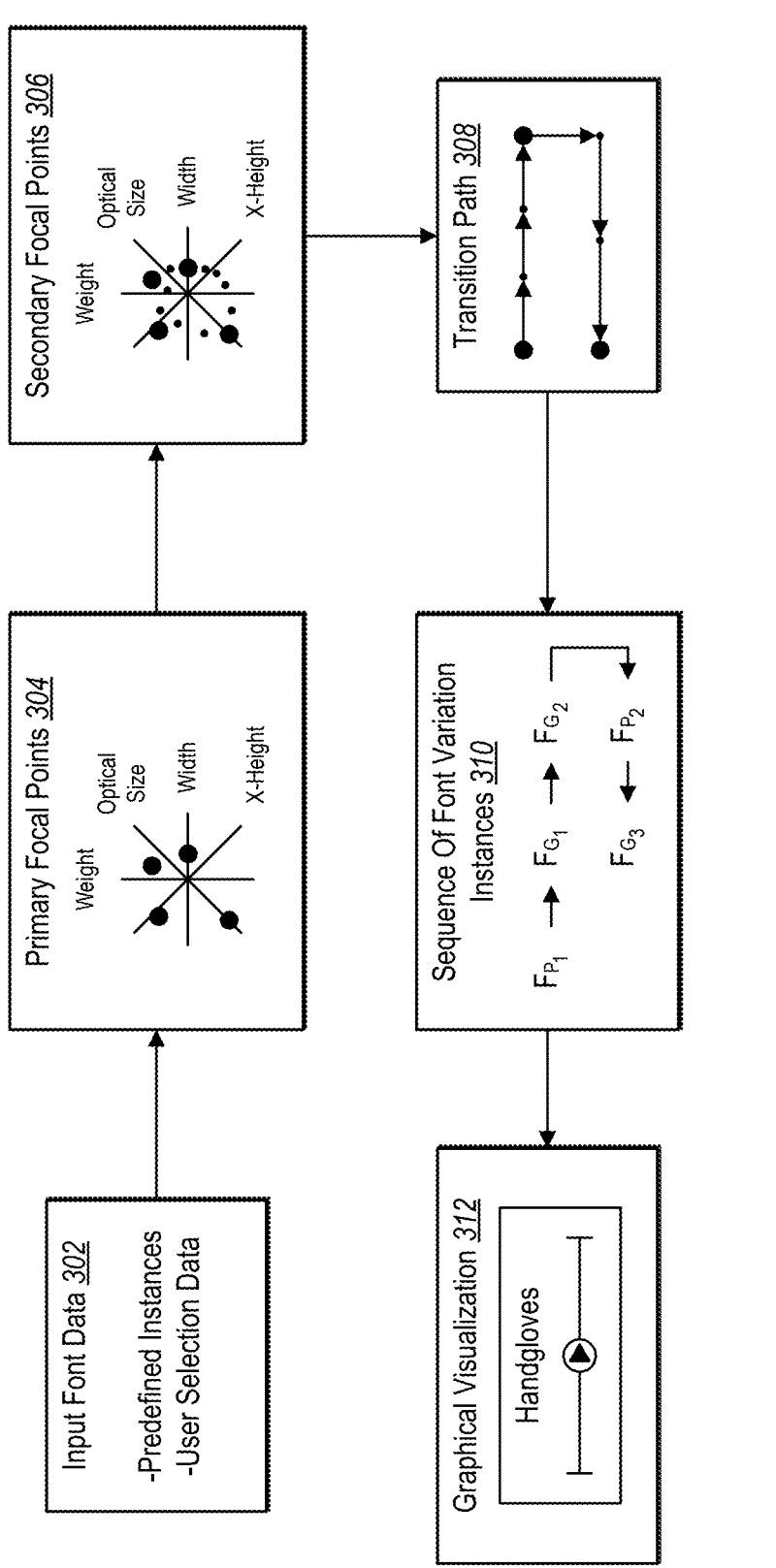
FIG. 3 illustrates an example diagram for generating a graphical visualization of a variable font in accordance with one or more embodiments.

As mentioned above, in certain described embodiments, the font variation system 102 generates a graphical visualization for a variable font based on extracting deep-aware focal points and determining a font transition path. In particular, the font variation system 102 generates or extracts primary and secondary focal points defining font variation instances in an n-dimensional font variation space. In addition, the font variation system 102 determines a font transition path for reordering font variation instances (e.g., those that are predefined and those corresponding to generated focal points) for a smooth graphical visualization. FIG. 3 illustrates an example diagram for generating a graphical visualization of a variable font in accordance with one or more embodiments.

As illustrated in FIG. 3, the font variation system 102 extracts or determines input font data 302. More specifically, the font variation system 102 determines a number of font presets or predefined font instances for the variable font, along with the font parameter data defining the predefined font instances (e.g., the values along each axis in the font variation space). In one or more embodiments, the font variation system 102 also determines user selection data for a variable font. Specifically, the font variation system 102 determines a location within a font adjustment tool or some other visualization where a client device indicates a user selection defining font parameters along one or more axes. In certain cases, the font variation system 102 further determines, as input font data 302, a threshold number of font instances or presets for generating primary focal points.

As also illustrated in FIG. 3, the font variation system 102 generates or extracts primary focal points 304. To elaborate, the font variation system 102 extracts and plots embeddings in a font variation space for defining visual characteristics of various predefined font instances. For instance, the font variation system 102 generates the primary focal points 304 to model known, predefined font instances of a variable font in an n-dimensional font variation space, where each dimension or axis corresponds to an individual characteristic or parameter, such as weight, optical size, width, or slant. In some cases, the font variation system 102 generates the same number of primary focal points as predefined font variation instances, while in other cases (e.g., if a threshold number of points or instances is not met), the font variation system 102 generates additional primary focal points.

In one or more embodiments, the font variation system 102 generates the primary focal points 304 by implementing a primary focal point algorithm. For instance, the font variation system 102 implements the primary focal point algorithm to determine a font-metric-aware centroid of the font variation space for a variable font. In addition, the primary focal point algorithm involves generating multivariate noise (e.g., Gaussian noise) and a covariance matrix based on variation range values for the variation axes in the font variation space. Further, the primary focal point algorithm involves adding the noise to font-metric-aware centroid of the font variation space by, for example, adding a noise vector (e.g., the generated noise) to each axis of the n-dimensional space to determine the primary focal points 304. In some cases, the primary focal point algorithm also involves rounding off to a standardized input axis value (if included as part of the input font data 302) for each of the primary focal points 304. As shown, the font variation system 102 generates four primary focal points in a font variation space that includes axes for weight, optical size, width, and x-height.

As further illustrated in FIG. 3, the font variation system 102 generates or extracts secondary focal points 306. More particularly, the font variation system 102 generates the secondary focal points 306 from the primary focal points 304. To elaborate, the font variation system 102 generates the secondary focal points 306 to fill spaces or gaps between the primary focal points 304 within the font variation space. In some embodiments, the font variation system 102 generates the secondary focal points 306 by modifying parameter values along one or more axes or dimensions of the font variation space for the variable font.

In one or more embodiments, the font variation system 102 generates the secondary focal points 306 by implementing a secondary focal point algorithm. Specifically, the secondary focal point algorithm involves normalizing the primary focal points 304. In addition, the secondary focal point algorithm involves generating a normalized grid based on the (normalized) primary focal points 304, where the grid indicates additional focal point locations within the font variation space. In some cases, the secondary focal point algorithm involves applying a radial basis function (RBF) to the normalized primary grid to synthesize the secondary focal points 306. Once generated, the secondary focal points 306 and the primary focal points 304 represent font variation instances (generated and predefined) of a variable font.

As further illustrated in FIG. 3, the font variation system 102 generates or determines a transition path 308. More specifically, the font variation system 102 determines the transition path 308 (or transition route) as a route or path for navigating or transiting from one font variation instance (or focal point) to the next in a particular sequence or order. Indeed, the font variation system 102 determines the transition path 308 using a transition path algorithm. The transition path algorithm sometimes includes determining an initial transition path, using a two-opt heuristic and swap calculation, and smoothening to generate the transition path 308 that indicates the order of focal points for smooth transitions among typefaces of a variable font.

Indeed, as shown in FIG. 3, the font variation system 102 utilizes the transition path 308 to generate or determine a sequence of font variation instances 310. More particularly, the font variation system 102 translates the focal points indicated by the transition path 308 into font typefaces of a variable font, each with its own unique visual characteristics. As shown, the font variation system 102 generates a sequence that starts with a predefined font variation instance $F_{P_1}$ and ends with a generated font variation instance $F_{G_3}$ (e.g., a font variation instance corresponding to a primary focal point or a secondary focal point).

As further illustrated in FIG. 3, the font variation system 102 generates a graphical visualization 312. In particular, the font variation system 102 generates the graphical visualization 312 in the form of a transition animation or some other visualization to show transitions among font variation instances of a variable font. For example, the graphical visualization 312 plays or presents the font instances in the same order as defined by the sequence of font variation instances 310 and/or the transition path 308. Thus, the graphical visualization 312 provides smoother, less visually jarring depictions of a variable font than visualizations of prior systems.

Figure 4:
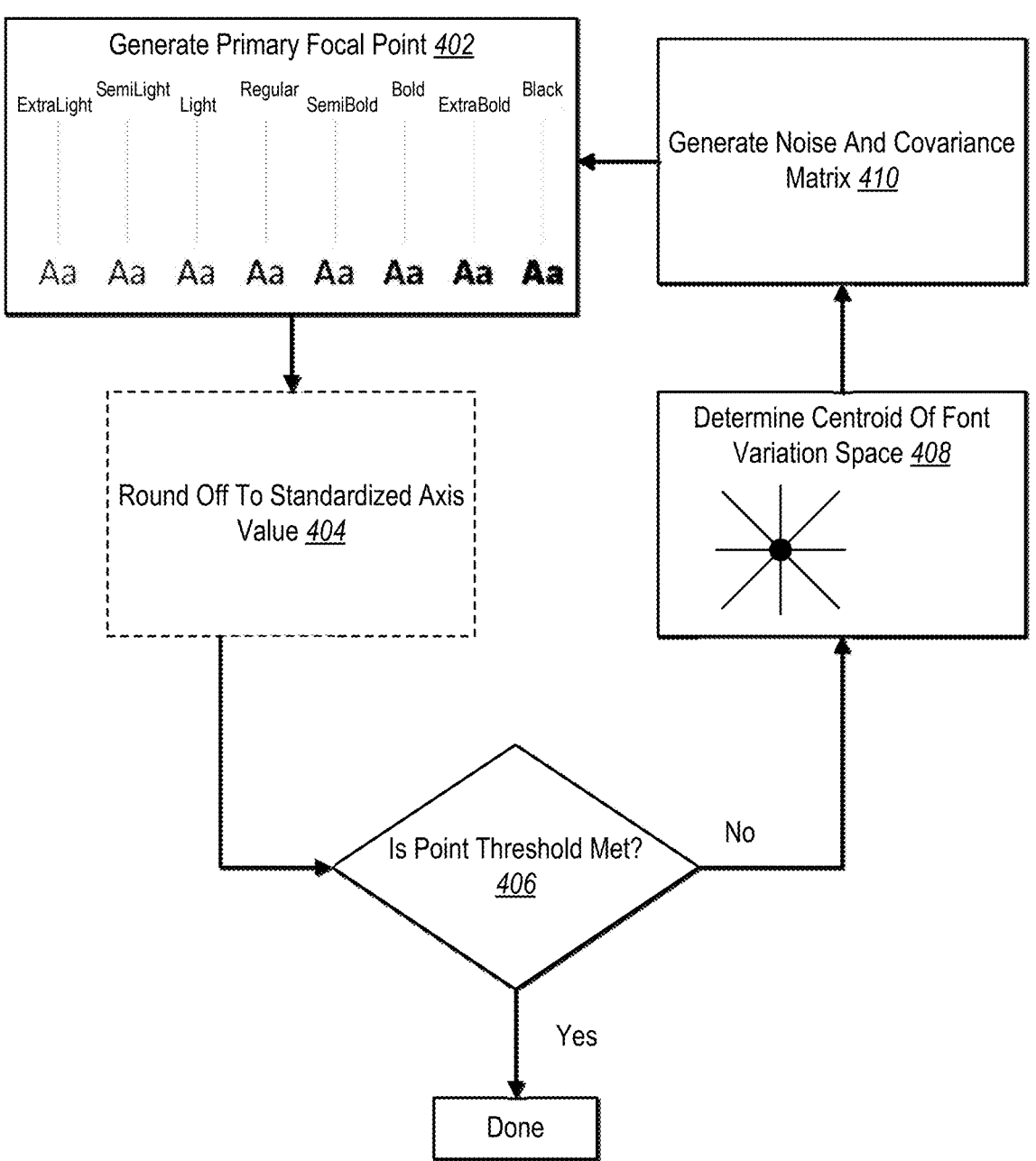
FIG. 4 illustrates an example diagram of generating primary focal points using a primary focal point algorithm in accordance with one or more embodiments.

As mentioned above, in certain described embodiments, the font variation system 102 generates or extracts primary focal points for a variable font. In particular, the font variation system 102 utilizes a primary focal point algorithm to generate primary focal points in a font variation space. FIG. 4 illustrates an example diagram of generating primary focal points using a primary focal point algorithm in accordance with one or more embodiments.

As illustrated in FIG. 4, the font variation system 102 performs an act 402 to generate a primary focal point. To elaborate, the font variation system 102 generates a primary focal point by extracting a feature vector or an embedding from a font variation instance of a variable font. In some embodiments, the font variation system 102 extracts a primary focal point for each predefined font variation instance of a variable font (or until a point/instance threshold is met, as described below), as designed or generated by font creators/designers. In certain cases, the font variation system 102 performs the act 402 to generate an evenly distributed set of variations (e.g., secondary focal points) in the font variation space while also honoring font metadata presets.

In some embodiments, the font variation system 102 generates a threshold number of primary focal points for predefined (or named) font instances. For example, the font variation system 102 sets a point threshold (or a font variation instance threshold) according to a number of presets or predefined font variation instances generated or defined by font creators. In some cases, the font variation system 102 sets a focal point threshold as given by the following:

$$t_{fvar}^{presets} = 5$$

where $$t_{fvar}^{presets}$$

represents the focal point threshold, fvar represents the named instances of a variable font, and 5 indicates an empirically defined number dictated by the number of known or named presets. In certain embodiments, the font variation system 102 determines a point threshold at a number different than 5, either higher or lower. The table below provides example fvar instances for primary focal points in a three-dimensional font variation space (e.g., one axis for each of width, weight, and slant).

| Style Name | Width | Weight | Slant | Instance Name |
|---|---|---|---|---|
| Thin Condensed | 75 | 100 | 0 | MyFont-ThinCondensed |
| Light Condensed | 75 | 300 | 0 | MyFont-LightCondensed |
| Regular | 100 | 400 | 0 | MyFont-Regular |
| Medium | 100 | 500 | 0 | MyFont-Medium |
| Bold Wide Italic | 125 | 700 | 1 | MyFont-BoldWideItalic |
| Black Wide Italic | 125 | 900 | 1 | MyFont-BlackWideItalic |

Using the instances of the above table, the font variation system 102 determines that the focal point threshold of 5 is met and that, therefore:

$$focals_{primary} = fvar_{instances}$$

where $focals_{primary}$ represents the primary focal points and $fvar_{instances}$ represents the named presents or font variation instances (e.g., from the table). The font variation system 102 thus generates a primary focal point for each predefined font variation instance in cases where the predefined font variation instances satisfy the focal point threshold.

If, on the other hand, the font variation system 102 determines that the number of predefined font variation instances (e.g., $fvar_{instances}$) is fewer than the threshold number of focal presets), the font variation system 102 generates additional primary focal points. For points $$\left(e.g., t_{fvar}^{presets}\right),$$

the font variation system 102 generates primary focal points using a primary focal point algorithm. In some cases, the primary focal point algorithm includes executing operations defined or represented by the following pseudo code:

```
PrimaryFocalPointAlgorithm (axes, num_points, std_width, std_weight)
  function PRIMARYFOCALPOINTALGORITHM (axes, num_points,
    std_width=none, std_weight=none)
    //calculate centroid of the font variation space
    centroid ← [(axes[axis]["min"] + axes[axis]["max"])/2 for axis in
    axes]
    //initialize the list of additional primary focal points
    additional_points ← [ ]
    //calculate the covariance matrix of the font variation space (e.g.,
    multivariate Gaussian distribution space)
    for i in range(num_points) do
      -generate multivariate Gaussian noise with mean 0 and covariance
      matrix based on the range of variation values for each axis
      if std_width is not None then
        -state each std_width value
        -calculate difference between the new axis value and each
        std_width value
        -round off the axis value to the nearest std_width value
      if std_weight is not None then
        -state each std_weight value
        -calculate difference between the new axis value and each
        std_weight value
        -round off the axis value to the nearest std_weight value
      end if
    //add the new axis value to the list of noise values
    additional_points.append(noisy_point)
    end for
    return additional_points
  end function
``` where num_points represents the threshold number of primary focal points, additional_points represents additional primary focal points to generate in addition to the initial list of predefined font variation instances, std_width represents a standardized width value defined as an industry standard among font creators, and std_weight represents a standardized weight value defined as an industry standard among font creators.

The above pseudo code represents one example of generating primary focal points in a font variation space. Indeed, in some embodiments, the font variation system 102 generates primary focal points in a font variation space with more, fewer, and/or different axes or dimensions than those for width and weight indicated in the pseudo code above. As part of the act 402, the font variation system 102 thus generates primary focal points (e.g., in cases where predefined instances do not satisfy the focal point threshold) as given by the following equation:

$$\text{focals}_{primary} = fvar_{instances} + PrimaryFocalPointAlgorithm$$

where PrimaryFocalPointAlgorithm represents primary focal points generated via a primary focal point algorithm, and the other terms are defined above.

Relating to standardized axis values, in some embodiments, the font variation system 102 determines or accesses standardized values stored for variable fonts. In some instances, standardized values are used in typography to represent a range of values in a consistent and meaningful way. Such standardized values are widely used and accepted among font creators and provide a way to understand and compare font variations or typefaces. The two tables below provide example standardized values for width and weight.

| Width Value | Width Style |
|---|---|
| 50 | Ultra-condensed |
| 62.5 | Extra-condensed |
| 75 | Condensed |
| 87.5 | Semi-condensed |
| 100 | Medium (normal) |
| 112.5 | Semi-wide |
| 125 | Wide |
| 150 | Extra-wide |
| 200 | Ultra-wide |

| Weight Value | Weight Style |
|---|---|
| 100 | Thin |
| 200 | Extra-light (Ultra-light) |
| 300 | Light |
| 400 | Normal (Regular) |
| 500 | Medium |
| 600 | Semi-bold (Demi-bold) |
| 700 | Bold |
| 800 | Extra-bold (Ultra-bold) |
| 900 | Black (Heavy) |

As further illustrated in FIG. 4, in some embodiments (e.g., in cases where additional primary focal points are needed to satisfy a focal point threshold), the font variation system 102 performs an act 404 to round off to a standardized axis value. Indeed, as indicated in the pseudo code above for the primary focal point algorithm, the font variation system 102 rounds off generated values for primary focal points to standardized values recognized in the field. For example, the font variation system 102 rounds off an axis-specific value to a nearest value for a characteristic corresponding to the same axis in font variation space.

Additionally, the font variation system 102 performs an act 406 to determine whether a point threshold is met. Specifically, the font variation system 102 compares a number of generated focal points with a focal point threshold. For instance, the font variation system 102 determines a number of focal points generated from predefined font variation instances as well as a number of focal points generated by adding Gaussian noise to a centroid of a font variation space (e.g., adding noise along a particular axis or dimension). If the font variation system 102 determines that the threshold is met, the font variation system 102 discontinues generating primary focal points and moves on to generating secondary focal points. On the other hand, if the font variation system 102 determines that the threshold is not met, the font variation system 102 continues generating primary focal points.

Specifically, as further illustrated in FIG. 4, the font variation system 102 performs an act 408 to determine a centroid of a font variation space. As part of the act 408, (and as indicated in the pseudo code above), the font variation system 102 determines a centroid based on mean values of latent space variables (e.g., per-axis average values). In these or other cases, the font variation system 102 determines a centroid based on a combination of font variation space axis values and font metrics, to capture intrinsic variation of a font design (as indicated by axis values on the font variation space) and observable characteristics of a font's glyphs (as quantified by the font metrics). Accordingly, the font variation system 102 determines a centroid of a font variation space by determining axis-specific values that flexibly adapt to both aspects font metrics and axis values.

As additionally illustrated in FIG. 4, the font variation system 102 performs an act 410 to generate noise and a covariance matrix. Indeed, as indicated in the pseudo code above, the font variation system 102 generates Gaussian noise and adds the noise vector to the centroid separately along each axis of the font variation space. To elaborate, the font variation system 102 generates a number of modified axis values by adding Gaussian noise to the centroid along each of the n axis in the font variation space. In some cases, the font variation system 102 generates a different noise vector for each axis, while in other cases the font variation system 102 generates and applies the same Gaussian noise vector to each axis. By adding a noise vector along each axis, the font variation system 102 thus generates additional primary focal points along the various axes. As shown, the font variation system 102 continues to repeat the depicted series of acts until the threshold of primary focal points is met.

Figure 5:
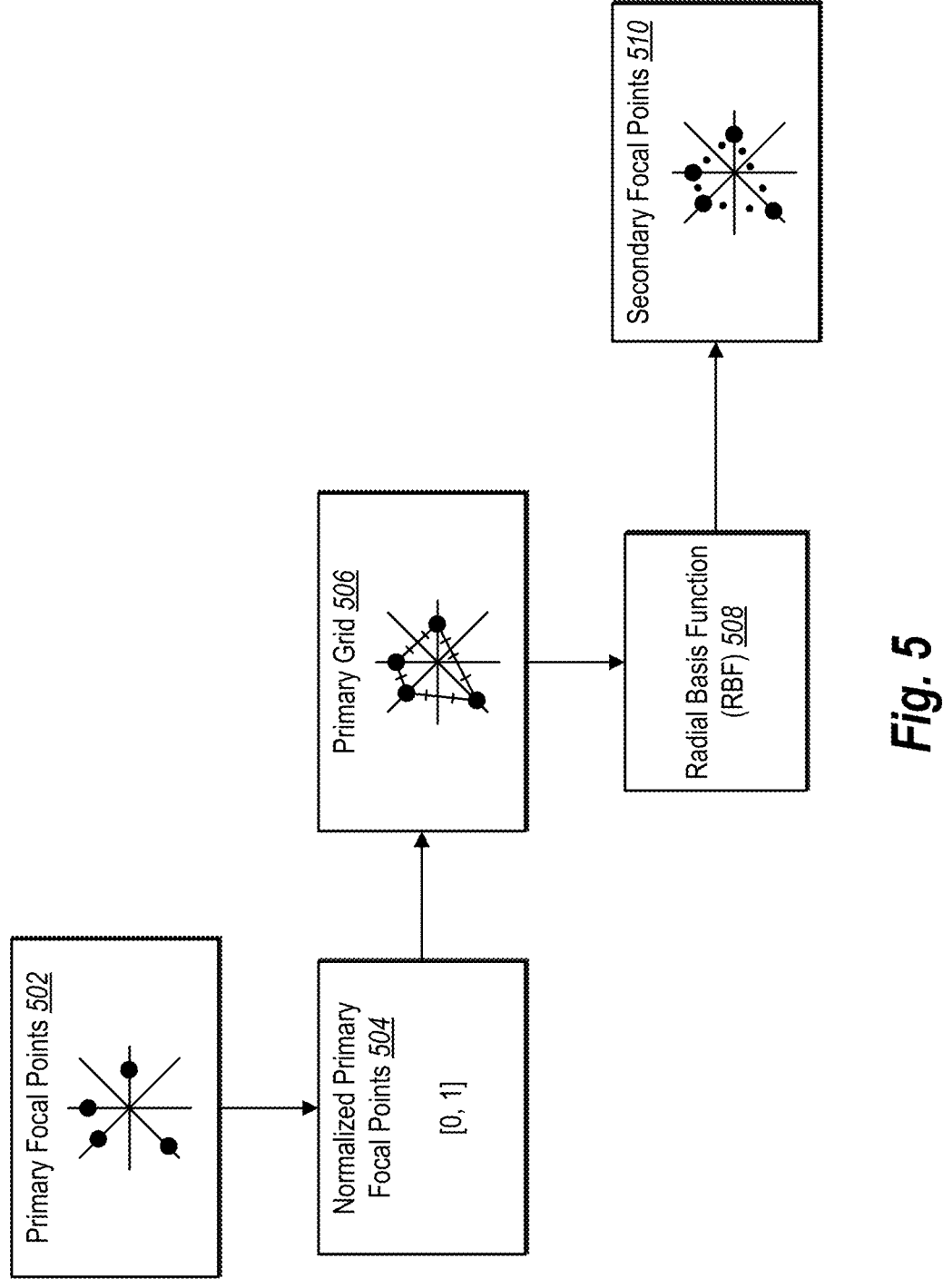
FIG. 5 illustrates an example diagram for generating secondary focal points using a secondary focal point algorithm in accordance with one or more embodiments.

As mentioned above, in certain embodiments, the font variation system 102 extracts or generates secondary focal points within a font variation space. In particular, the font variation system 102 generates secondary focal points using a secondary focal point algorithm that sets primary focal points as a starting point or basis for determining secondary axis values. FIG. 5 illustrates an example diagram for generating secondary focal points using a secondary focal point algorithm in accordance with one or more embodiments.

As illustrated in FIG. 5, the font variation system 102 identifies primary focal points 502 within a font variation space. Indeed, the font variation system 102 generates or extracts the primary focal points 502 as described above. From the primary focal points 502, the font variation system 102 generates normalized primary focal points 504. To elaborate, the font variation system 102 normalizes the primary focal points 502. Specifically, the font variation system 102 accepts an array of the primary focal points 502 in the font variation space and normalizes the array such that each axis value is within a range of [0,1]. The font variation system 102 normalizes according to the minimum and maximum value of each respective axis. For example, the font variation system 102 performs independent normalizations for each axis in the font variation space, where each axis has its own minimum and maximum values to normalize to [0,1].

As additionally illustrated in FIG. 5, the font variation system 102 generates a primary grid 506 from the normalized primary focal points 504. To elaborate the font variation system 102 generates the primary grid 506 in the multidimensional font variation space to mirror the dimensions of the primary focal points (e.g., the number of variation axes). The font variation system 102 generates the primary grid 506 to align on the primary focal points (e.g., on the variation axes). The primary grid 506 thus outlines or indicates positions in the font variation space where secondary focal points are synthesized. In some cases, the primary grid 506 indicates intermediate positions (e.g., at evenly distributed intervals) between the normalized primary focal points 504 in the font variation space.

As further illustrated in FIG. 5, the font variation system 102 utilizes a radial basis function 508 (RBF) to generate or synthesize secondary focal points 510. More specifically, the font variation system 102 uses the radial basis function 508 as a non-linear interpolation method to capture complex patterns in focal point data (not captured by linear methods). In some cases, the radial basis function 508 generates a smooth curve or surface that passes through input points (e.g., the normalized primary focal points 504 and/or the points in the primary grid 506). The font variation system 102 initializes the radial basis function 508 at the normalized primary focal points 504 and applies the radial basis function 508 to the primary grid 506, assigning weights to each axis/dimension based on font metrics and metadata to emphasize and de-emphasize the various characteristics of the font. Using the radial basis function 508 scales well to higher dimensions where, as the dimensionality of the font variation space increases, the number of points required to represent the space does not grow exponentially as it might otherwise do with other methods.

As further illustrated in FIG. 5, the font variation system 102 generates secondary focal points 510 using the radial basis function 508. Specifically, the radial basis function 508 reshapes the output from the RBF mechanism to match a desired shape (e.g., the number of points indicated by the primary grid 506 and/or the number of axes in the font variation space) and returns a corresponding array of secondary focal points 510. These secondary focal points 510 represent novel, unique instances of a variable font, smoothly distributed within the font variation space. The font variation system 102 thus generates a more evenly distributed set of variations for smoother animations as compared to prior systems. Indeed, by transforming the primary focal points 502 into a denser array including the secondary focal points 510, the font variation system 102 provides a powerful method of exploring and discovering innovative typographic configuration in a font variation space.

Figure 6:
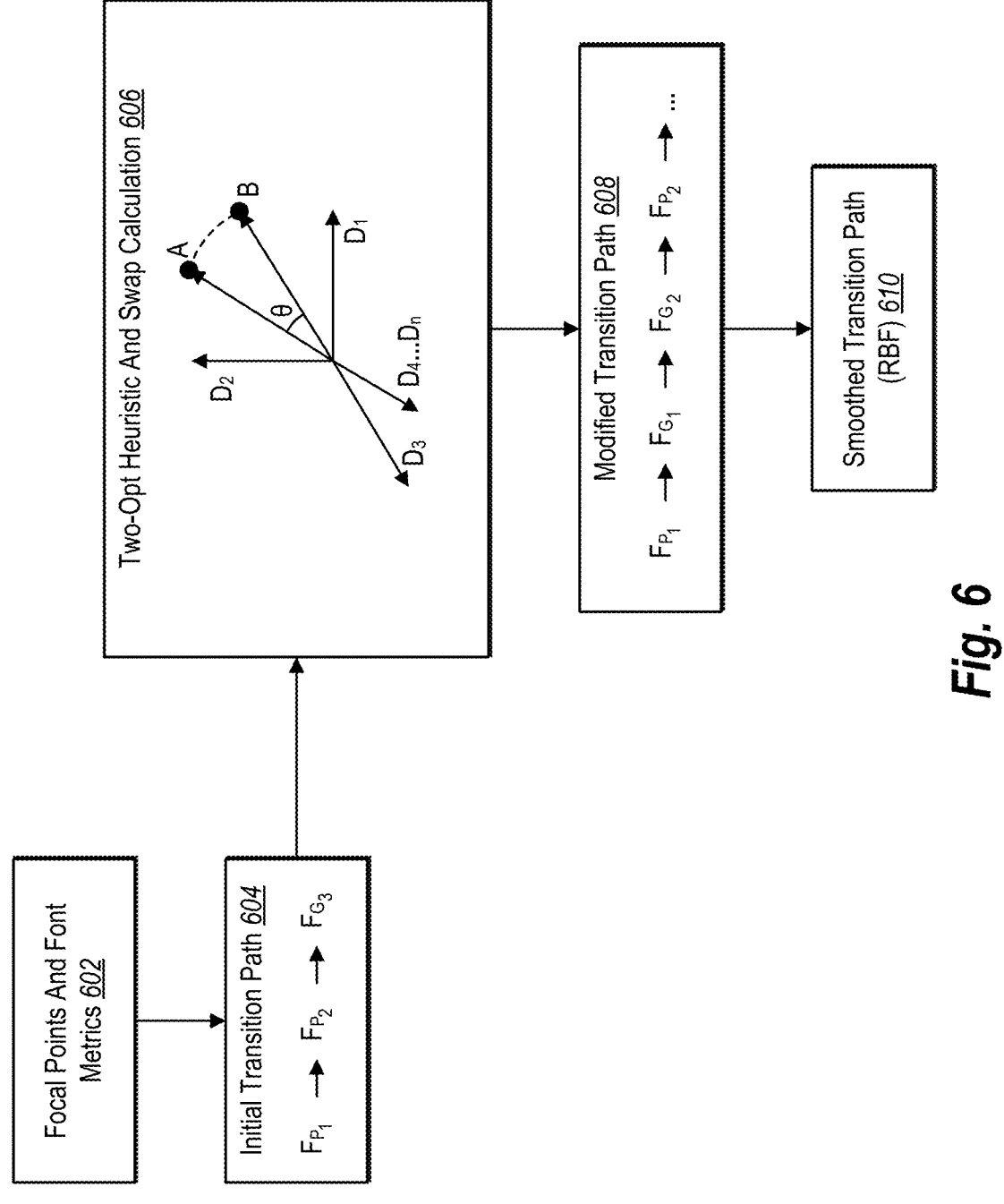
FIG. 6 illustrates an example diagram of determining a font transition path using a transition path algorithm in accordance with one or more embodiments.

As mentioned above, in certain embodiments, the font variation system 102 generates or determines a font transition path. In particular, the font variation system 102 determines a font transition path using a transition path algorithm for smoothly navigating or transitioning between font variation instances of a variable font. FIG. 6 illustrates an example diagram of determining a font transition path using a transition path algorithm in accordance with one or more embodiments.

As illustrated in FIG. 6, the font variation system 102 determines focal points and font metrics 602. More specifically, the font variation system 102 determines primary focal points and secondary focal points determined via a primary focal point algorithm and a secondary focal point algorithm, as described above. In addition, the font variation system 102 determines font metrics, such as axis-specific parameters that (together with the focal points) represent states of a variable font.

As also illustrated in FIG. 6, the font variation system 102 determines an initial transition path 604. In particular, the font variation system 102 determines an initial order or sequence of primary and secondary focal points that represent the states of the variable font. The font variation system 102 orders the focal points in a particular sequence, such as a predefined sequence, or along a path among the focal within the font variation space. In some cases, the font variation system 102 also defines an improvement threshold which indicates when the transition path algorithm stops its search for a more optimal sequence.

In addition, the font variation system 102 utilizes a two-opt heuristic and a swap calculation 606. More particularly, the font variation system 102 deploys a two-opt heuristic to iteratively enhance the font transition path by changing and testing the sequence of focal points over multiple iterations. For instance, the font variation system 102 swaps two states/points in the sequence and determines whether the total distance (or difference) of the sequence decreases as a result of the swap. Indeed, the font variation system 102 determines an overall path distance of the initial transition path 604 and for each candidate transition path that results from swapping two focal points. The font variation system 102 further compares pre-swap and post-swap path distances (e.g., cumulative distances between focal points in the font variation space) to determine whether the distance decreases due to the swap. The font variation system 102 repeats the swapping and testing process until no further enhancement is possible and/or until the distance improvement is less than the improvement threshold.

To perform the comparison between two paths, the font variation system 102 totals the distances between focal points of the paths in order. The font variation system 102 determines distances using a cosine distance calculation (e.g., without considering font metric weights). In some embodiments, the font variation system 102 determines cosine similarity for comparing two vectors (e.g., focal points) according to the following equation:

$$\cos(A, B) = \frac{A \cdot B}{\|A\| \|B\|} = \frac{\sum_{i=1}^{n} A_i B_i}{\sqrt{\sum_{i=1}^{n} (A_i)^2} \sqrt{\sum_{i=1}^{n} (B_i)^2}}$$

where A and B represent vectors or focal points to compare. Indeed, as shown in FIG. 6, the font variation system 102 determines a distance between focal point A with focal point B in the font variation space using the above formula.

In addition, the font variation system 102 performs the swap calculation for each pair of states/points considered in the two-opt heuristic. For example, the font variation system 102 determines a new transition sequence and its overall path distance to compare with the path distance of the previous iteration's path. As mentioned, the font variation system 102 repeats the process until the improvement threshold is satisfied.

As shown in FIG. 6, the font variation system 102 thus generates a modified transition path 608. Indeed, the font variation system 102 generates the modified transition path 608 by identifying a candidate path with the shortest total distance based on the two-opt comparisons. Once the iterations are complete, the font variation system 102 selects the shortest path as the modified transition path 608.

As further illustrated in FIG. 6, the font variation system 102 generates a smoothed transition path 610. To elaborate, the font variation system 102 utilizes a radial basis function (RBF) to perform additional interpolation to smoothen the modified transition path 608. For example, the font variation system 102 generates a smooth curve fitting the reordered sequence of focal points in the font variation space. In some cases, the font variation system 102 generates an RBF for each dimension/axis of the focal points (e.g., for different font metrics if the states are multidimensional) and generates a set of interpolated points using the RBFs. By using the two-opt heuristic and the RBF, the font variation system 102 efficiently optimizes (or reduces the distance of) the sequence of font variation instances and smoothens the transition path in a unique fashion not found in prior systems.

Figure 7:
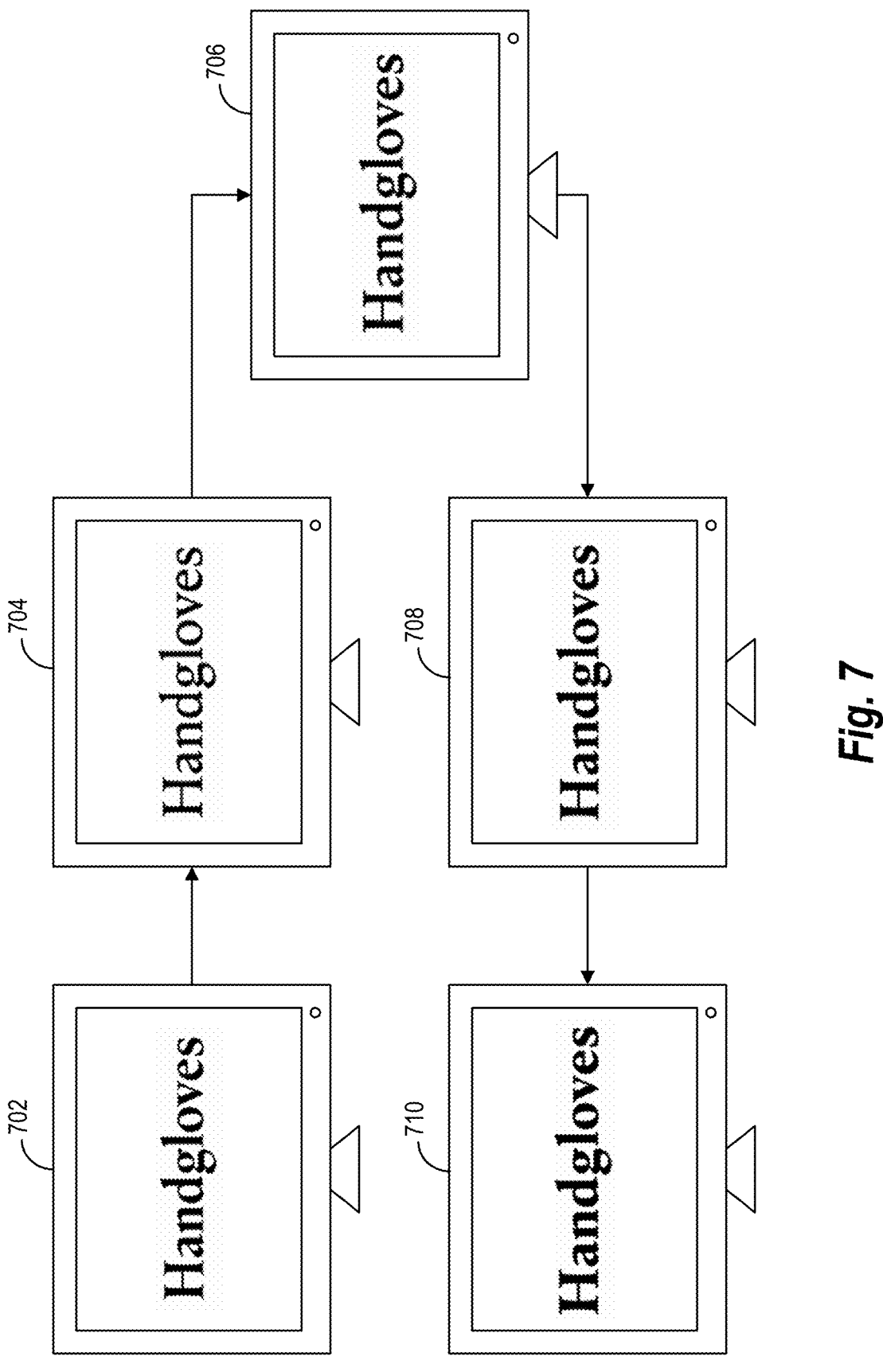
FIG. 7 illustrates an example flow of font variation instances as part of a font transition animation in accordance with one or more embodiments.

As mentioned, in certain embodiments, the font variation system 102 generates a font transition animation. In particular, the font variation system 102 generates a font transition animation that smoothly plays through the sequence of font variation instances indicated by a (smoothed) font transition path. FIG. 7 illustrates an example flow of font variation instances as part of a font transition animation in accordance with one or more embodiments.

As illustrated in FIG. 7, the font variation system 102 generates and provides a sequence of frames for display within a font transition animation. For instance, the font transition animation includes a frame 702, a frame 704, a frame 706, a frame 708, and a frame 710. As shown, each of the frames depicts a font variation instance of a variable font, progressing in a sequential order of visual style. The font variation system 102 generates the frames of the animation in a particular order or sequence as a result of generating primary and secondary focal points and determining a font transition path among the focal points. Indeed, the font variation system 102 generates a smooth animation that plays through font variation instances according to the two-opt heuristic and swap calculation for reordering the focal points based on relative path distances. Thus, the font variation system 102 generates a font transition animation that is smoother and more visually appealing than animations of prior systems.

Figure 8:
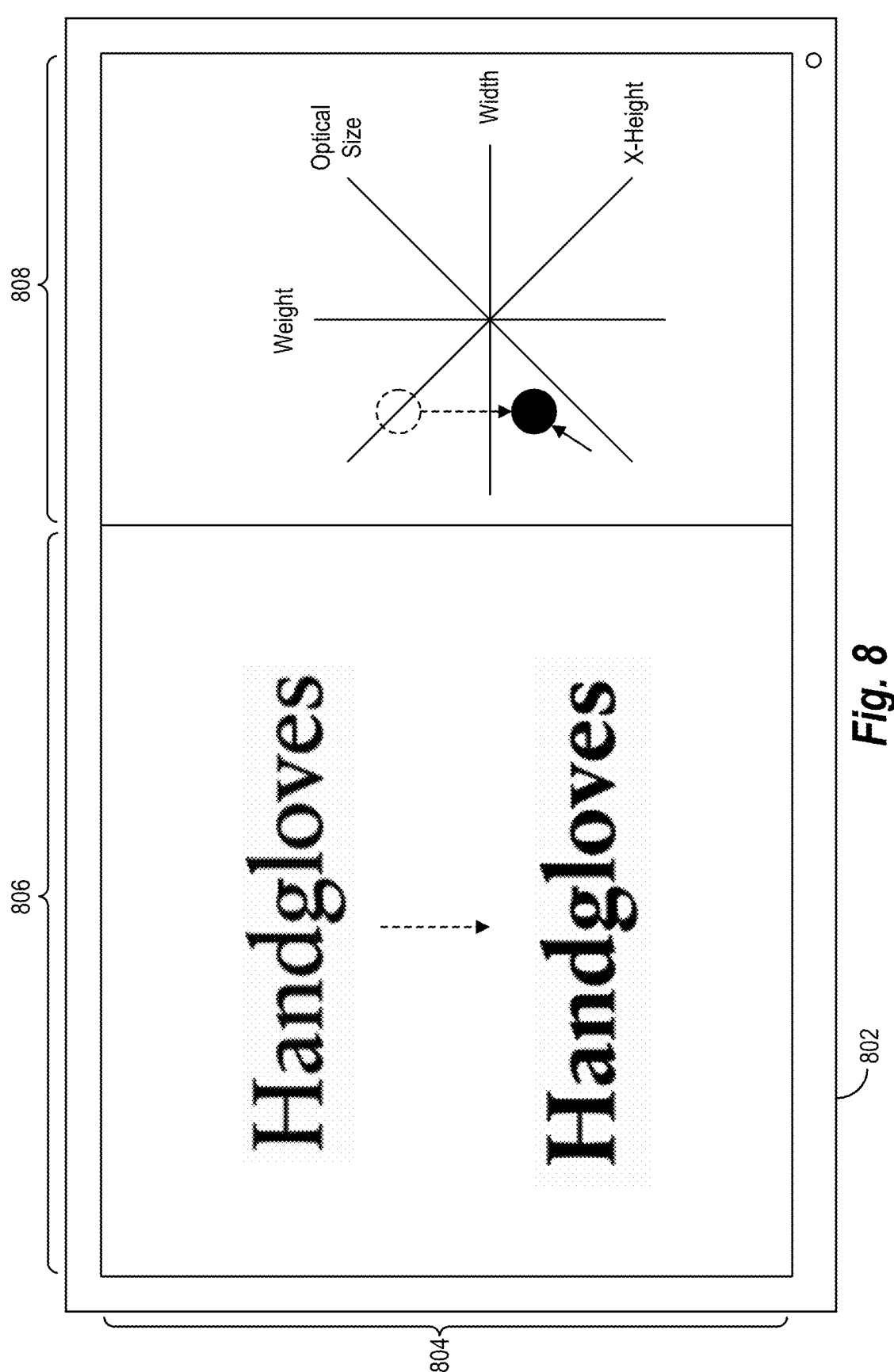
FIG. 8 illustrates an example graphical visualization for a variable font in accordance with one or more embodiments.

As mentioned above, in certain embodiments, the font variation system 102 generates additional and/or alternative graphical visualizations for a variable font (e.g., apart from font transition animations). In particular, the font variation system 102 generates interactive graphical visualizations that are manipulable via a client device to adjust font metrics for selecting font variation instances of a variable font. FIG. 8 illustrates an example graphical visualization for a variable font in accordance with one or more embodiments.

As illustrated in FIG. 8, the font variation system 102 generates and provides a font variation interface 804 for display on a client device 802. Within the font variation interface 804, the font variation system 102 provides a font visualization window 806 and a font manipulation window 808. As shown, the pucker or dot within the font manipulation window 808 indicates a location in font variation space corresponding to the depicted font instance variation in the font visualization window 806. As the font variation system 102 receives data from the client device 802 indicating user interaction moving the handle, the font variation system 102 updates the font variation instance shown in the font visualization window 806 to coincide with the font metrics defined by the location of the handle in the font variation space (e.g., relative to the various axes or dimensions).

In some cases, the font variation system 102 generates focal points with enough density to provide a font variation instance for any pixel location for the handle within the font variation space of the font manipulation window 808. In other cases, the font variation system 102 determines a nearest focal point to an indicated/selected location of the handle and snaps the handle to the location of the nearest focal point. The font variation system 102 additionally updates the font visualization window 806 in real time with manipulation of the handle (e.g., up selection or during drag operations) to show variable font instances corresponding to the placement of the handle as it moves. Accordingly, the font variation system 102 provides highly controllable variable fonts with more selectable options in the font variation space than are available in prior systems (and using tools not provided by prior systems).

Figure 9:
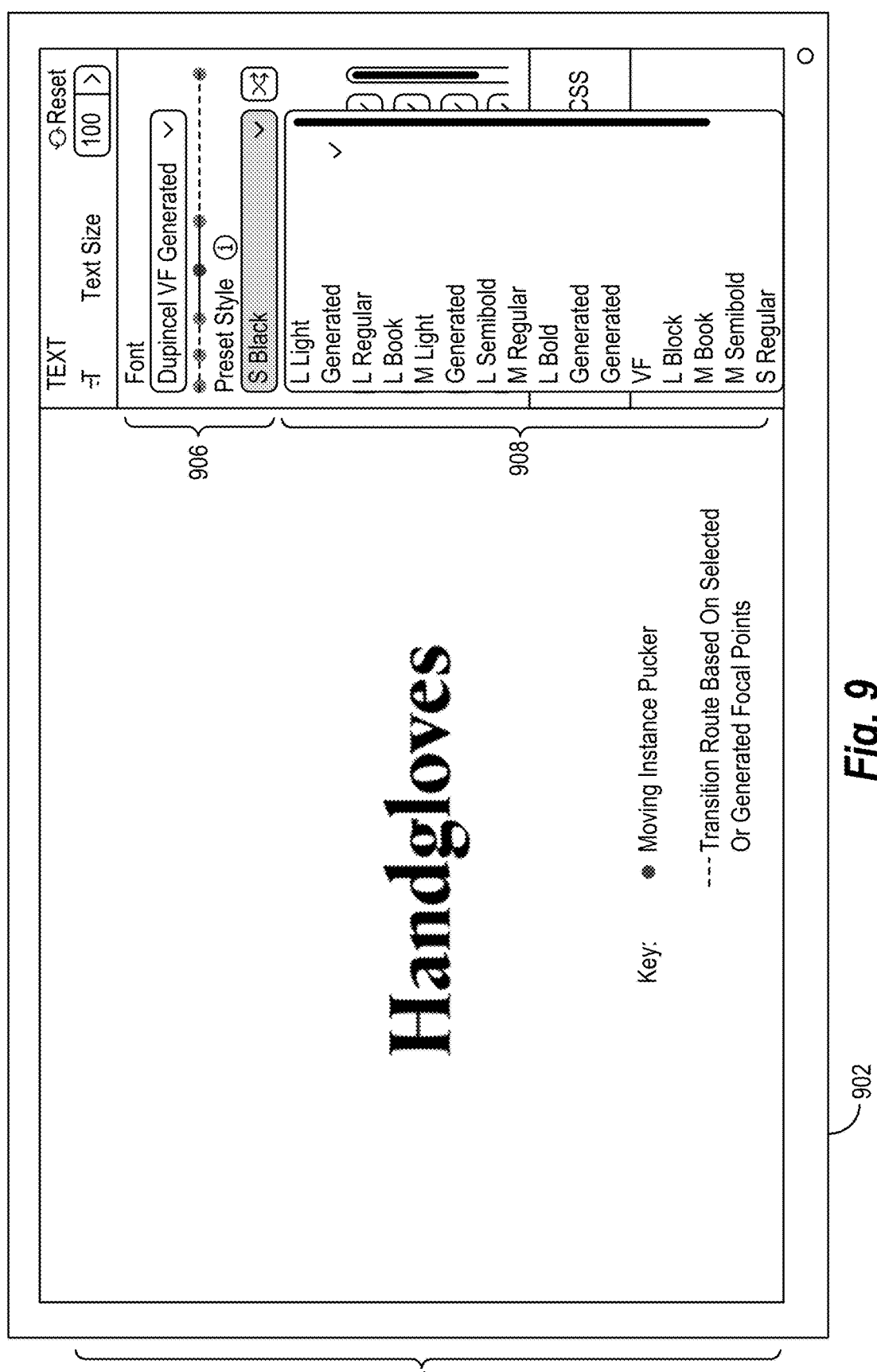
FIG. 9 illustrates an example font variation interface in accordance with one or more embodiments.

In some embodiments, the font variation system 102 provides additional or alternative graphical visualizations. In particular, the font variation system 102 generates a font variation interface that includes a single line segment for moving a handle or pucker to change the appearance of a variable font. FIG. 9 illustrates an example font variation interface in accordance with one or more embodiments.

As illustrated in FIG. 9, the font variation system 102 generates and provides a font variation interface 904 for display on a client device 902. Within the font variation interface 904, the font variation system 102 provides a menu 908 of font variation instances that includes generated instances corresponding to primary and secondary focal points and that is also reordered according to a font transition path.

The font variation system 102 also provides a font adjustment tool 906 for modifying typefaces of a variable font. As shown, the font adjustment tool 906 includes a line segment with puckers or handles corresponding to focal points within a font variation space. Indeed, the font variation system 102 condenses a multidimensional font variation space into a single line segment to depict a linear representation of the font transition path, with puckers or handles that are selectable to view the corresponding variable font instances (e.g., shown in the menu 908). In some cases, the font variation system 102 automatically moves along the instances from pucker to pucker to show the sequence of font variation instances in the order of the font transition path (while also scrolling down the menu 908).

Figure 10:
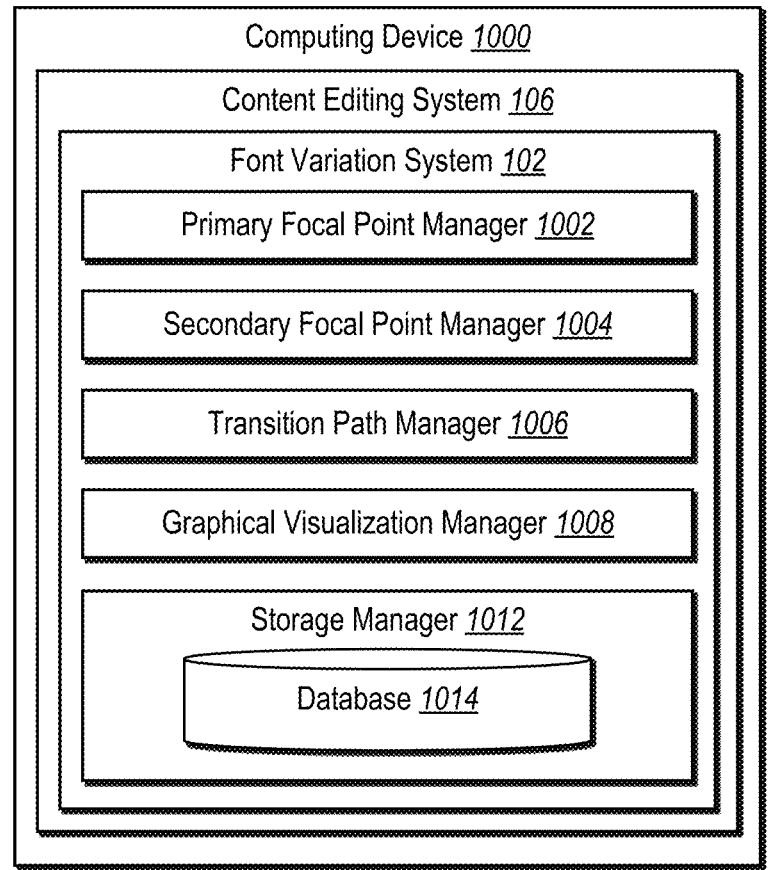
FIG. 10 illustrates a schematic diagram of a font variation system in accordance with one or more embodiments.

Looking now to FIG. 10, additional detail will be provided regarding components and capabilities of the font variation system 102. Specifically, FIG. 10 illustrates an example schematic diagram of the font variation system 102 on an example computing device 1000 (e.g., one or more of the client device 108 and/or the server(s) 104). In some embodiments, the computing device 1000 refers to a distributed computing system where different managers are located on different devices, as described above. As shown in FIG. 10, the font variation system 102 includes a primary focal point manager 1002, a secondary focal point manager 1004, a transition path manager 1006, a graphical visualization manager 1008, and a storage manager 1012.

As just mentioned, the font variation system 102 includes a primary focal point manager 1002. In particular, the primary focal point manager 1002 manages, maintains, determines, generates, extracts, or embeds primary focal points in a font variation space. For example, the primary focal point manager 1002 implements a primary focal point algorithm to generate primary focal points from predefined font variation instances as described above.

In addition, the font variation system 102 includes a secondary focal point manager 1004. In particular, the secondary focal point manager 1004 manages, maintains, determines, generates, extracts, or embeds secondary focal points in a font variation space. For example, the secondary focal point manager 1004 generates secondary focal points from primary focal points using a secondary focal point algorithm as described above.

As shown, the font variation system 102 includes a transition path manager 1006. In particular, the transition path manager 1006 manages, maintains, determines, generates, calculates, or identifies a font transition path among focal points in a font variation space. For example, the transition path manager 1006 uses a transition path algorithm to determine a font transition path for transitioning between font variation instances or typefaces to smoothly visualize the stylistic differences between instances of a variable font.

In addition, the font variation system 102 includes a graphical visualization manager 1008. In particular, the graphical visualization manager 1008 manages, maintains, generates, provides, monitors, presents, or portrays a graphical visualization of a variable font. For instance, the graphical visualization manager 1008 generates a font transition animation or another type of visualization to depict changes between font variation instances according to a font transition path.

The font variation system 102 further includes a storage manager 1012. The storage manager 1012 operates in conjunction with, or includes, one or more memory devices such as the database 1014 (e.g., the database 114) that store various data such as font parameters/metrics, focal points, transition path data, and other information. The storage manager 1012 communicates with the other components of the font variation system 102 to facilitate the operations and functions described herein.

In one or more embodiments, each of the components of the font variation system 102 are in communication with one another using any suitable communication technologies. Additionally, the components of the font variation system 102 is in communication with one or more other devices including one or more client devices described above. It will be recognized that although the components of the font variation system 102 are shown to be separate in FIG. 10, any of the subcomponents may be combined into fewer components, such as into a single component, or divided into more components as may serve a particular implementation. Furthermore, although the components of FIG. 10 are described in connection with the font variation system 102, at least some of the components for performing operations in conjunction with the font variation system 102 described herein may be implemented on other devices within the environment.

The components of the font variation system 102, in one or more implementations, includes software, hardware, or both. For example, the components of the font variation system 102 include one or more instructions stored on a computer-readable storage medium and executable by processors of one or more computing devices (e.g., the computing device 1000). When executed by the one or more processors, the computer-executable instructions of the font variation system 102 cause the computing device 1000 to perform the methods described herein. Alternatively, the components of the font variation system 102 comprises hardware, such as a special purpose processing device to perform a certain function or group of functions. Additionally, or alternatively, the components of the font variation system 102 includes a combination of computer-executable instructions and hardware.

Furthermore, the components of the font variation system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the font variation system 102 may be implemented as part of a stand-alone application on a personal computing device or a mobile device. Alternatively, or additionally, the components of the font variation system 102 may be implemented in any application that allows creation and delivery of marketing content to users, including, but not limited to, applications in ADOBE® EXPERIENCE MANAGER and CREATIVE CLOUD®, such as ADOBE® FONTS, PHOTOSHOP®, ILLUSTRATOR®, and INDESIGN®. "ADOBE," "ADOBE EXPERIENCE MANAGER," "CREATIVE CLOUD," "ADOBE FONTS," "PHOTOSHOP," "ILLUSTRATOR," and "INDESIGN" are either registered trademarks or trademarks of Adobe Inc. in the United States and/or other countries.

FIGS. 1-10 the corresponding text, and the examples provide a number of different systems, methods, and non-transitory computer readable media for generating and visualization font variation instances of a variable font using deep-aware focal points in a font variation space. In addition to the foregoing, embodiments are describable in terms of flowcharts comprising acts for accomplishing a particular result. For example, FIG. 11 illustrates a flowcharts of an example sequences or series of acts in accordance with one or more embodiments.

Figure 11:
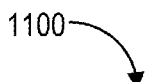
FIG. 11 illustrates a flowchart of a series of acts for generating and visualization font variation instances of a variable font using deep-aware focal points in a font variation space in accordance with one or more embodiments.
Figure 11:
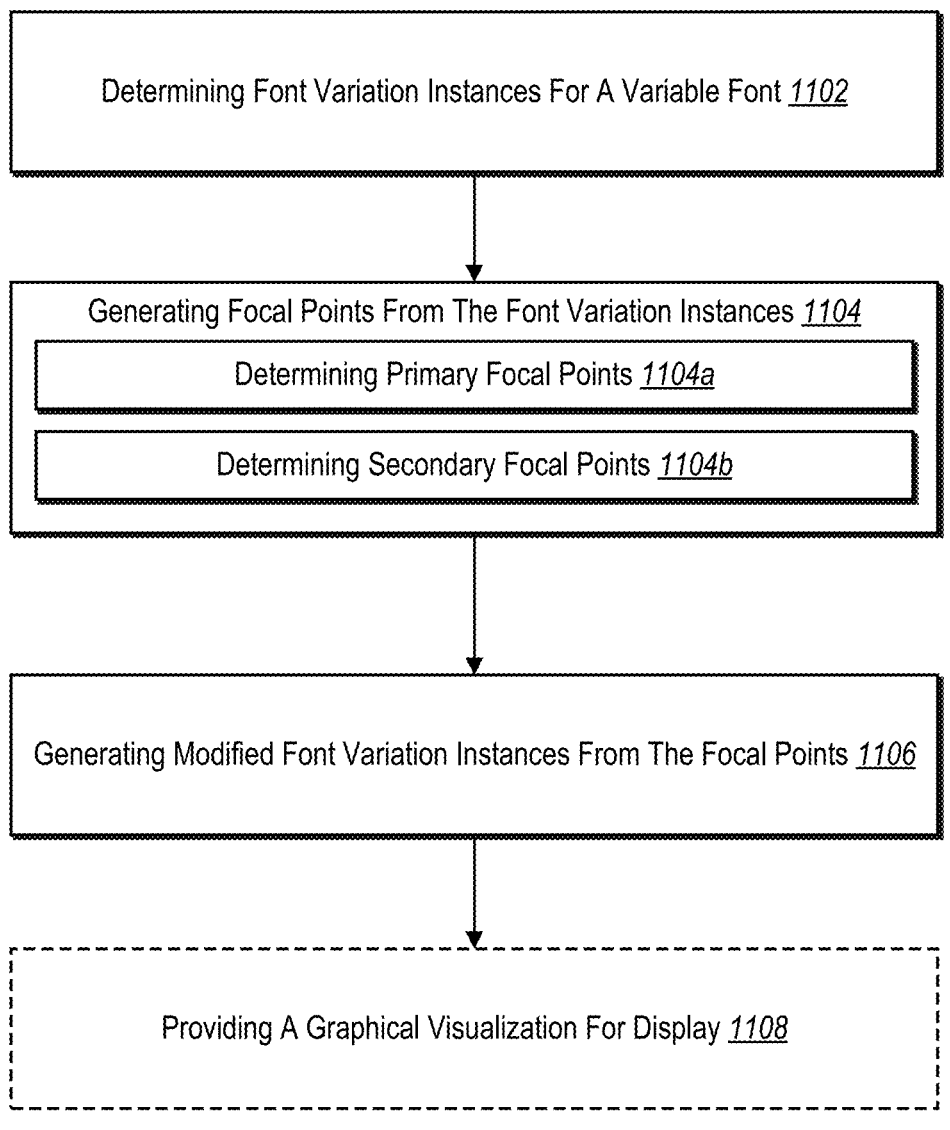

While FIG. 11 illustrates acts according to particular embodiments, alternative embodiments may omit, add to, reorder, and/or modify any of the acts shown in FIG. 11. The acts of FIG. 11 are be performed as part of a method. Alternatively, a non-transitory computer readable medium comprises instructions, that when executed by one or more processors, cause a computing device to perform the acts of FIG. 11. In still further embodiments, a system performs the acts of FIG. 11. Additionally, the acts described herein may be repeated or performed in parallel with one another or in parallel with different instances of the same or other similar acts.

FIG. 11 illustrates an example series of acts 1100 for generating and visualization font variation instances of a variable font using deep-aware focal points in a font variation space. In particular, the series of acts 1100 includes an act 1102 of determining font variation instances for a variable font. For example, the act 1102 involves determining, for a variable font, a set of predefined font variation instances defining named typeface variations of the variable font. In addition, the series of acts 1100 includes an act 1104 of generating focal points from the font variation instances. For example, the act 1104 involves generating, from the set of predefined font variation instances, a plurality of focal points representing additional typeface variations of the variable font in a font variation space.

As shown, the act 1104 includes an act 1104*a* of determining primary points. For example, the act 1104 involves generating a set of primary focal points representing additional typeface variations of the variable font in a font variation space. In addition, the act 1104 includes an act 1104*b* of determining secondary focal points. For example, the act 1104*b* includes generating a set of secondary focal points representing further typeface variations of the variable font based on positions of the set of primary focal points in the font variation space. As also shown, the series of acts 1100 includes an act 1106 of generating modified font variation instances from the focal points. For example, the act 1106 involves generating, from the plurality of focal points in the font variation space, a modified set of font variation instances defining intermediate typeface variations between the named typeface variations of the variable font. In some embodiments, the series of acts 1100 includes an act 1108 of providing a graphical visualization for display. For example, the act 1108 involves providing, for display on a client device, a graphical visualization of the modified set of font variation instances.

In some embodiments, the series of acts 1100 includes an act of generating the plurality of focal points by: determining primary focal points based on a centroid of the font variation space and determining secondary focal points based on a grid representing dimensions of the primary focal points in the font variation space. In addition, the series of acts 1100 includes an act of determining a font transition path by: comparing distances between the plurality of focal points in the font variation space and ordering typeface variations of the variable font according to the distances between the plurality of focal points in the font variation space.

In certain embodiments, the series of acts 1100 includes an act of generating the modified set of font variation instances by generating a modified font variation instance for each focal point from among the plurality of focal points. Additionally, the series of acts 1100 includes an act of generating the plurality of focal points by generating focal points in multiple dimensions that represent respective visual characteristics of the variable font. Further, the series of acts 1100 includes an act of generating the plurality of focal points by: generating a set of primary focal points by augmenting a centroid of the font variation space defined by visual characteristics of the variable font and generating a set of secondary focal points that fill in additional space between the set of primary focal points within the font variation space.

In one or more embodiments, the series of acts 1100 includes an act of generating the set of primary focal points by: determining a centroid of the font variation space for the variable font, generating a covariance matrix for the font variation space, and generating a primary focal point by adding noise data to the centroid of the font variation space according to the covariance matrix. In addition, the series of acts 1100 includes an act of generating the set of secondary focal points by: normalizing the set of primary focal points along dimension axes in the font variation space, based on normalizing the set of primary focal points, generating a grid defining positions between normalized primary focal points in the font variation space where secondary focal points are synthesized, and generating a secondary focal point at a position indicated by the grid utilizing a radial basis function.

In certain embodiments, the series of acts 1100 includes an act of generating the graphical visualization by generating a font transition animation that smoothly plays through the modified set of font variation instances by: determining an initialization sequence for the modified set of font variation instances, comparing an initial sequence distance for the initialization sequence with a modified sequence distance for an alternative font variation sequence wherein positions of a first font variation and a second font variation are swapped within the initialization sequence, and generating a modified animation sequence based on comparing the initial sequence distance with the modified sequence distance. In these or other embodiments, the series of acts 1100 includes an act of receiving, from the client device, an indication of user interaction with the graphical visualization in relation to a portion of the font variation space. Additionally, the series of acts 1100 includes an act of updating the graphical visualization to include additional font variation instances within the portion of the font variation space based on the user interaction.

In one or more embodiments, the series of acts 1100 includes an act of determining the set of predefined font variation instances by determining named typeface variants of the variable font from a font data repository. In the same or other embodiments, the series of acts 1100 includes an act of generating the modified set of font variation instances by generating typeface variations that provide intermediate steps which smoothly transition from one name typeface variant to another for the variable font. Additionally, the series of acts 1100 includes an act of generating the primary focal points by: generating noise data for applying to the centroid of the font variation space and generating the primary focal points by adding noise data to the centroid of the font variation space according to a covariance matrix.

In some cases, the series of acts 1100 includes an act of generating the secondary focal points by: normalizing the primary focal points along dimension axes defining visual characteristics of the variable font in the font variation space, based on normalizing the primary focal points, generating a grid defining positions between normalized primary focal points in the font variation space, and generating the secondary focal points at the positions indicated by the grid. Additionally, the series of acts 1100 includes an act of generating a font transition animation that smoothly plays through the modified set of font variation instances by: comparing an initial sequence distance for an initial sequence of font variations with a modified sequence distance for an alternative sequence of font variations, generating a modified animation sequence by swapping font variation positions based on comparing the initial sequence distance with the modified sequence distance, and smoothing the modified animation sequence by using a radial basis function to generate interpolated points between the plurality of focal points.

In addition, the series of acts 1100 includes an act of providing, for display on a client device, a graphical visualization of the modified set of font variation instances. Further, the series of acts 1100 includes an act of receiving, from the client device, an indication of user interaction with the graphical visualization in relation to a portion of the font variation space. Additionally, the series of acts 1100 includes an act of updating the graphical visualization to include additional font variation instances within the portion of the font variation space based on the user interaction.

Embodiments of the present disclosure may comprise or use a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) use transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
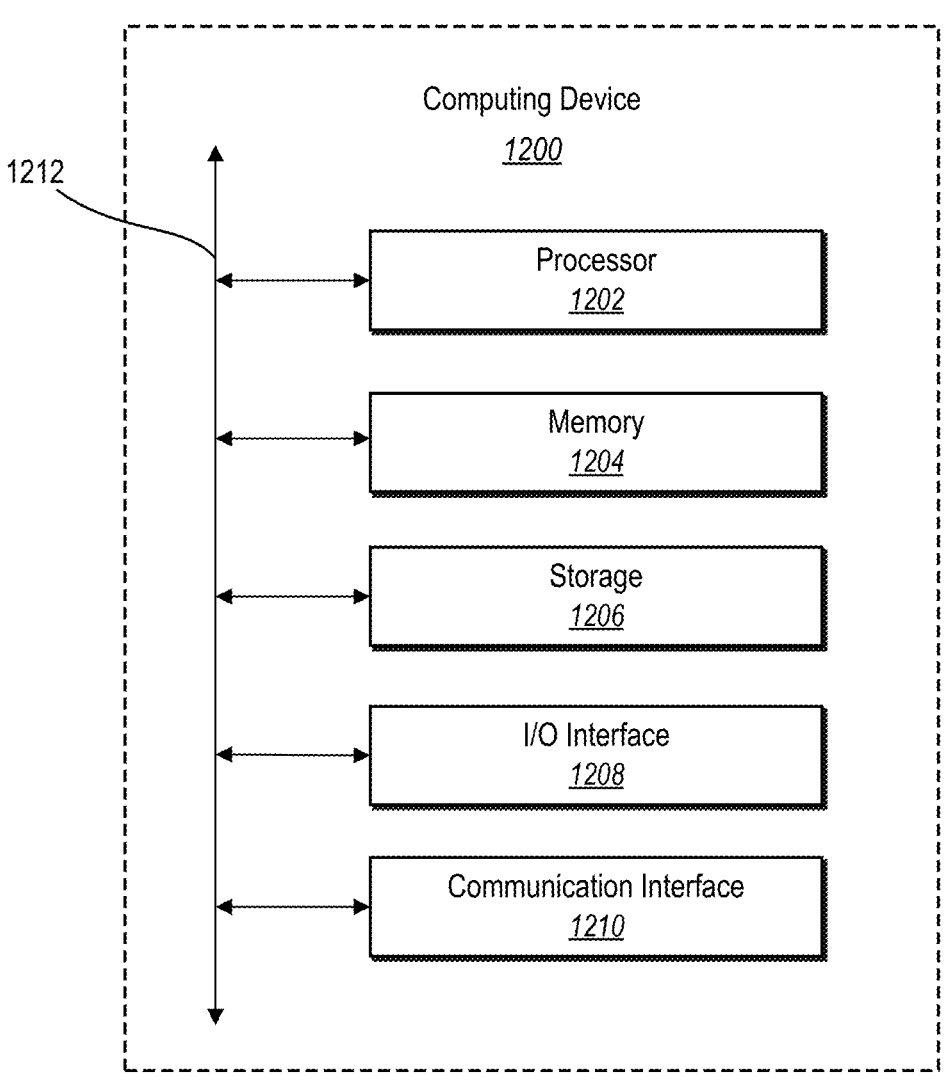
FIG. 12 illustrates a block diagram of an example computing device for implementing one or more embodiments of the present disclosure.

FIG. 12 illustrates a block diagram of an example computing device 1200 that may be configured to perform one or more of the processes described above. One will appreciate that one or more computing devices, such as the computing device 1200 may represent the computing devices described above (e.g., computing device 1000, server(s) 104, and/or client device 108). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   determining, for a variable font, primary focal points representing a set of predefined font variation instances defining named typeface variations of the variable font;
   generating, from the set of predefined font variation instances, secondary focal points representing additional typeface variations of the variable font in a font variation space based on a grid representing dimensions of the primary focal points in the font variation space; and
   generating, from the secondary focal points in the font variation space, a modified set of font variation instances defining intermediate typeface variations between the named typeface variations of the variable font.

2. The computer-implemented method of claim 1, wherein determining the primary focal points comprises:
   determining a centroid of the font variation space; and
   generating a primary focal point by adding noise data to the centroid according to a covariance matrix for the font variation space.

3. The computer-implemented method of claim 1, further comprising determining a font transition path by:
   comparing distances between a plurality of focal points comprising the primary focal points and the secondary focal points in the font variation space; and
   ordering typeface variations of the variable font according to the distances between the plurality of focal points in the font variation space.

4. The computer-implemented method of claim 1, wherein generating the modified set of font variation instances comprises generating a modified font variation instance for each focal point from among the secondary focal points.

5. The computer-implemented method of claim 1, wherein generating the secondary focal points comprises generating focal points in multiple dimensions that represent respective visual characteristics of the variable font.

6. The computer-implemented method of claim 1, wherein generating the secondary focal points comprises:

generating a set of primary focal points by augmenting a centroid of the font variation space defined by visual characteristics of the variable font; and generating a set of secondary focal points that fill in additional space between the set of primary focal points within the font variation space.

7. The computer-implemented method of claim 1, further comprising providing a graphical visualization of the modified set of font variation instances for display on a client device.

8. A non-transitory computer readable medium storing executable instructions which, when executed by a processing device, cause the processing device to perform operations comprising:

determining, for a variable font, a set of predefined font variation instances defining named typeface variations of the variable font;

generating, from the set of predefined font variation instances:

a set of primary focal points representing additional typeface variations of the variable font in a font variation space; and a set of secondary focal points representing further typeface variations of the variable font based on a grid representing dimensions of the set of primary focal points in the font variation space;

generating, from the set of primary focal points and the set of secondary focal points in the font variation space, a modified set of font variation instances defining intermediate typeface variations between the named typeface variations of the variable font; and providing, for display on a client device, a graphical visualization of the modified set of font variation instances.

9. The non-transitory computer readable medium of claim 8, wherein generating the set of primary focal points comprises:

determining a centroid of the font variation space for the variable font;

generating a covariance matrix for the font variation space; and generating a primary focal point by adding noise data to the centroid of the font variation space according to the covariance matrix.

10. The non-transitory computer readable medium of claim 8, wherein generating the set of secondary focal points comprises:

normalizing the set of primary focal points along dimension axes in the font variation space;

based on normalizing the set of primary focal points, generating a grid defining positions between normalized primary focal points in the font variation space where secondary focal points are synthesized; and generating a secondary focal point at a position indicated by the grid utilizing a radial basis function.

11. The non-transitory computer readable medium of claim 8, further comprising generating the graphical visualization by generating a font transition animation that smoothly plays through the modified set of font variation instances by:

determining an initialization sequence for the modified set of font variation instances;

comparing an initial sequence distance for the initialization sequence with a modified sequence distance for an alternative font variation sequence wherein positions of a first font variation and a second font variation are swapped within the initialization sequence; and generating a modified animation sequence based on comparing the initial sequence distance with the modified sequence distance.

12. The non-transitory computer readable medium of claim 8, further comprising:

receiving, from the client device, an indication of user interaction with the graphical visualization in relation to a portion of the font variation space; and updating the graphical visualization to include additional font variation instances within the portion of the font variation space based on the user interaction.

13. The non-transitory computer readable medium of claim 8, wherein determining the set of predefined font variation instances comprises determining named typeface variants of the variable font from a font data repository.

14. The non-transitory computer readable medium of claim 8, wherein generating the modified set of font variation instances comprises generating typeface variations that provide intermediate steps which smoothly transition from one name typeface variant to another for the variable font.

15. A system comprising:

one or more memory devices; and one or more processors coupled to the one or more memory devices, the one or more processors configured to cause the system to:

determine, for a variable font, a set of predefined font variation instances defining named typeface variations of the variable font;

generate, from the set of predefined font variation instances, a plurality of focal points representing additional typeface variations of the variable font in a font variation space by:

determining primary focal points based on a centroid of the font variation space; and determining secondary focal points based on a grid representing dimensions of the primary focal points in the font variation space; and generate, from the plurality of focal points in the font variation space, a modified set of font variation instances defining intermediate typeface variations between the named typeface variations of the variable font.

16. The system of claim 15, wherein the one or more processors are further configured to cause the system to generate the primary focal points by:

generating noise data for applying to the centroid of the font variation space; and generating the primary focal points by adding noise data to the centroid of the font variation space according to a covariance matrix.

17. The system of claim 15, wherein the one or more processors are further configured to cause the system to generate the secondary focal points by:

normalizing the primary focal points along dimension axes defining visual characteristics of the variable font in the font variation space;

based on normalizing the primary focal points, generating a grid defining positions between normalized primary focal points in the font variation space; and generating the secondary focal points at the positions indicated by the grid.

18. The system of claim 15, wherein the one or more processors are further configured to cause the system to generate a font transition animation that smoothly plays through the modified set of font variation instances by:

comparing an initial sequence distance for an initial sequence of font variations with a modified sequence distance for an alternative sequence of font variations;

generating a modified animation sequence by swapping font variation positions based on comparing the initial sequence distance with the modified sequence distance; and smoothing the modified animation sequence by using a radial basis function to generate interpolated points between the plurality of focal points.

19. The system of claim 15, wherein the one or more processors are further configured to cause the system to provide, for display on a client device, a graphical visualization of the modified set of font variation instances.

20. The system of claim 19, wherein the one or more processors are further configured to cause the system to:

receive, from the client device, an indication of user interaction with the graphical visualization in relation to a portion of the font variation space; and update the graphical visualization to include additional font variation instances within the portion of the font variation space based on the user interaction.

* * * * *